UNITED STATES PATENT OFFICE.

MAX LANDAU, OF BERLIN, GERMANY.

MANUFACTURE OF PURE LACTIC ACID.

1,157,402. Specification of Letters Patent. Patented Oct. 19, 1915.

No Drawing. Application filed July 8, 1915. Serial No. 38,683.

*To all whom it may concern:*

Be it known that I, MAX LANDAU, chemist, a subject of the King of Prussia and the German Emperor, residing at 29 Bayerische street, Berlin, Kingdom of Prussia, German Empire, have invented a new and useful Improvement in the Manufacture of Pure Lactic Acid; and I do hereby declare the following to be a full, clear, and exact description of the same.

The processes hitherto known for producing pure lactic acid from commercial lactic acid are based on: 1, the production of salts, or esters, insoluble in water, and the isolation of these and then the extraction of pure lactic acid by the decomposition of the said compounds; 2, the extraction of the lactic acid from the crude acid by means of various solvents; 3, the distillation of lactic acid while passing through it a current of an inert gas.

In Gmelin's *Handbuch der Organischen Chemie*, 4th edition, Vol. II, 1852, page 857, it is stated that the lactic acid obtained by decomposing calcium lactate is dissolved in ether for the purpose of removing traces of salt, filtrated and obtained after the evaporation of the diluent.

From a knowledge of the fact that, by mixing lactic acid with ether, traces of inorganic salts can be removed from this acid it could not have been foreseen that organic matter such as the sugary matter, contained as impurity in commercial lactic acid could be removed by mixing the acid with alcohols so that it is in a form which will allow of ready filtration. The 50 per cent. lactic acid of commerce is usually a dark, Bordeaux-red, or claret colored product and contains: lactic acid, about 50 per cent.; lactic anhydrid, from about 3 to 4 per cent.; dextrin, from about 1 to 2 per cent., the rest being water.

According to this invention pure lactic acid is made by first decolorizing commercial aqueous lactic acid, (which may be done in any suitable way, for instance by boiling with a decolorizer such as charcoal, kieselguhr, gypsum, and the like, preferably while a current of indifferent gas is passed therethrough) and then concentrating as far as possible and precipitating by means of alcohol organic substances especially sugary matter and distilling off the alcohols after the precipitate has been separated.

This invention may be carried out as follows, but I do not limit myself to the precise details hereinafter stated: 100 kilograms of commercial lactic acid, containing about 50 per cent. of real lactic acid are decolorized by repeated boiling with animal charcoal. As the substances which give color to commercial lactic acid are precipitated with difficulty on the charcoal, care must be taken that the liquid is kept in as intimate contact as possible with the decolorizing substance. This can be effected, for instance, if the lactic acid, after the addition thereto of the charcoal, be heated in using a reflux condenser for about 8 hours while an indifferent gas is passed therethrough. The filtrate of the charcoal is, after say two boilings, almost entirely colorless. The product is then concentrated to a content of from 90 to 95 per cent. of lactic acid, the distillation of the water being preferably effected *in vacuo*. The distillation is carried out until the thermometer indicates about 80° centigrade and the lactic acid thus obtained becomes a product that is but feebly colored and highly concentrated and contains but very little water. It is then admixed with about 1½ times its weight of alcohol as free from water as possible. In this way the dextrin is separated out as a fine flocculent precipitate, and the yield is almost theoretical. After being allowed to stand for 24 hours, the precipitate will have completely settled, and can be removed by filtration. The alcohol is recovered by distilling it from the filtrate, and pure lactic acid is obtained, which presents all the physical properties described in chemical literature as appertaining to pure lactic acid. By dilution with water, the pure lactic acid can be brought to the required degree of concentration.

Ether has been frequently used for the purpose of extracting lactic acid, but it is unsuitable for the process in accordance with this invention, as thereby the sugary matter contained in the commercial lactic acid as impurity can only be separated in a viscous form which is extremely difficult to filter and, moreover, a not inconsiderable part thereof remains in the lactic acid. The isolation of the sugary matters in this form is difficult to filter, and this is a great disadvantage, as, especially with a slow filtration, an important amount of ether evaporates so that the process is not economically satisfactory.

What I claim is:—

1. The manufacture of pure lactic acid by first decolorizing commercial aqueous lactic acid by means of insoluble decolorizing substances, bringing the decolorized commercial aqueous lactic acid to a higher concentration, afterward precipitating sugary or other organic matter by adding alcohol to the concentrated decolorized lactic acid, separating the precipitate and distilling off such alcohol from the liquid.

2. The manufacture of pure lactic acid by first decolorizing commercial aqueous lactic acid, while an indifferent gas is passed through a boiling mixture of such acid and an insoluble decolorizing substance, bringing the decolorized commercial aqueous lactic acid to a higher concentration, afterward precipitating sugary or other organic matter by adding alcohol to the concentrated decolorized lactic acid, separating the precipitate and distilling off such alcohol from the liquid.

3. The manufacture of pure lactic acid by first decolorizing commercial aqueous lactic acid by means of insoluble decolorizing substances, bringing the decolorized commercial aqueous lactic acid to a higher concentration using a vacuum, afterward precipitating sugary or other organic matter by adding alcohol to the concentrated decolorized lactic acid, separating the precipitate and distilling off such alcohol from the liquid.

4. The manufacture of pure lactic acid by first decolorizing commercial aqueous lactic acid, while an indifferent gas is passed through a boiling mixture of such acid and an insoluble decolorizing substance, bringing the decolorized commercial aqueous lactic acid to a higher concentration, by effecting the distillation of the water *in vacuo*, afterward precipitating sugary or other organic matter by adding alcohol to the concentrated decolorized lactic acid, separating the precipitate and distilling off such alcohol from the liquid.

In testimony whereof, I have signed my name to this specification in the presence of two subscribing witnesses.

MAX LANDAU.

Witnesses:
 WOLDEMAR HAUPT,
 HENRY HASPER.